United States Patent [19]

Haverdink et al.

[11] 4,197,916
[45] Apr. 15, 1980

[54] ROOT CROP HARVESTER

[75] Inventors: Virgil D. Haverdink, Ankeny; John E. Maust, Jr., Des Moines; Fred C. Livesay, Jr., Ankeny, all of Iowa

[73] Assignee: Deere & Company, Moline, Ill.

[21] Appl. No.: 947,181

[22] Filed: Sep. 29, 1978

[51] Int. Cl.² .............................................. A01D 17/16
[52] U.S. Cl. ....................................... 171/58; 198/601; 198/625; 209/669; 15/3.11
[58] Field of Search ...................... 171/50, 53, 55–62; 15/3.11; 198/475, 601, 448, 624, 457, 625, 456, 778; 209/241, 669

[56] References Cited

U.S. PATENT DOCUMENTS

| | | | |
|---|---|---|---|
| 2,960,813 | 11/1960 | Jones | 56/106 |
| 3,399,766 | 9/1968 | Rollins | 209/669 |
| 3,451,084 | 6/1969 | Silver | 15/3.11 |
| 3,747,149 | 7/1973 | Tatyanko et al. | 15/3.11 |
| 3,792,733 | 2/1974 | Crandall et al. | 171/58 |
| 4,024,920 | 5/1977 | Haverdink | 171/58 |
| 4,049,058 | 9/1977 | Eisenhardt et al. | 171/58 |

*Primary Examiner*—Russell R. Kinsey

[57] ABSTRACT

An improved root crop harvester having a narrow and compact processing chassis adapted to simply and easily receive header assemblies of differing capacities. The header assemblies include a transverse roll conveyor for gathering roots received from the digger wheels into a stream for discharge through a central opening in the transverse conveyor to a fore-and-aft extending roll conveyor carried by the processing chassis. The fore-and-aft roll conveyor is inclined upwardly from front to rear to increase the scrubbing and tumbling action and is also provided with a reversing roll section at its rearward end to discharge the roots to the side. The fore-and-aft conveyor is also sloped across its width at its rearward end to aid in discharging roots transversely to the roll conveyor length. The conveyors on the processing chassis are carried between the support wheels to reduce side drafts, minimize wheel slippage in wet field conditions and improve transport maneuverability.

22 Claims, 10 Drawing Figures

4,197,916

ROOT CROP HARVESTER

BACKGROUND OF THE INVENTION

The present invention relates generally to agricultural equipment and more particularly to beet harvesters.

Root crops such as sugar beets commonly have substantial amounts of dirt and other foreign material clinging to them as they are removed from the soil. If the dirt or other foreign material is not substantially removed from the beets during the field harvesting operation, harvesting productivity and capacity will be reduced and the price received for the beets will be affected.

To remove the dirt and other material from the beets, conventional beet harvesters are provided with multiple conveyors to separate the foreign material from the beet as it is conveyed through the harvester. These harvesters typically provide a first conveyor which receives the beets from the digging means and then delivers the beets for subsequent tumbling and cleaning to several other conveyors prior to elevating them for discharge into a storage tank on the box of a truck moving alongside the harvester. These conveyors are generally quite long so that the time during which the beet or root is tumbled and scrubbed is sufficient to remove the dirt and foreign material.

As a result, conventional root crop harvesters are typically wide and long with portions of cleaner conveyors extending laterally beyond the ground support wheels of the harvester. Often times these conveyors prevent transport of the harvester over narrow roads or bridges. Further, large buildings must be provided to store the implement between the harvesting seasons.

Another problem encountered with many conventional harvesters arises from the weight distribution of these multiple and lengthy conveyors on the ground support wheels. To permit the beets to be elevated for transfer to a truck, some of the conveyors must be grouped to one side of the harvester. The weight of that portion of the conveyors that extends laterally outside the ground support wheels results in side drafts during transport or field operations. Accordingly, steering is affected and often times the wheels will slip or skid in wet or muddy field conditions.

SUMMARY OF THE INVENTION

The present invention is designed to overcome these problems.

To provide a narrow and maneuverable implement, the improved harvester utilizes a unique, narrow processing chassis that can attach to header assemblies of different widths and also has the capacity to process the harvest of each header assembly. The chassis is provided with simplified support connections whereon the various header assemblies can be mounted. The power train arrangements between the chassis and header require that only two drive couplings be connected to transmit power from the PTO of the tractor to the operating components of the header assembly and processing chassis.

A compact, simple and efficient header assembly is provided by reducing the number of cleaning conveyors to two. The header assembly utilizes a chain or star wheel-type conveyor to convey the beets from the digging means, then gathers them into a central stream with a transverse grab roll conveyor and discharges them through a unique centrally positioned transverse discharge opening in the transverse grab roll conveyor. The beets are discharged onto the forward end of a fore-and-aft extending grab roll conveyor that is carried beneath the frame of the processing chassis. A unique chassis-carried bracket serves as a header support in that it supports the spaced apart terminating ends of the two transverse grab rolls on the header which form the discharge opening to the fore-and-aft roll conveyor. The bracket further serves to support the forward end of the fore-and-aft grab roll conveyor.

The narrow configuration for the processing chassis is provided by utilizing a single cleaner conveyor in the form of a fore-and-aft extending roll conveyor that is carried between the support wheels of the chassis. The processing capacity of this four roll conveyor is easily changed by adding or removing two rolls. To further aid in maintaining the narrow configuration, an elevating wheel conveyor is also carried between the ground support wheels and receives the beets from the fore-and-aft conveyor which has been adapted at its rearward end to move beets transversely.

Dirt and other foreign material are removed from the beets by utilizing grab rolls in the header gathering conveyor and the fore-and-aft processing conveyor. The grab rolls of the latter conveyor are inclined upwardly from front to rear to increase the beet travel time and scrubbing action and they also form a transverse slope at their discharge end to assure sideways discharge of the beets.

Steering control of the harvester is improved and wheel slippage in wet or muddy field conditions is minimized through positioning the processing chassis conveyors between the support wheels and by supporting the header assembly on the framework of the processing chassis.

DESCRIPTION OF THE PREFERRED EMBODIMENT

Figure 1:
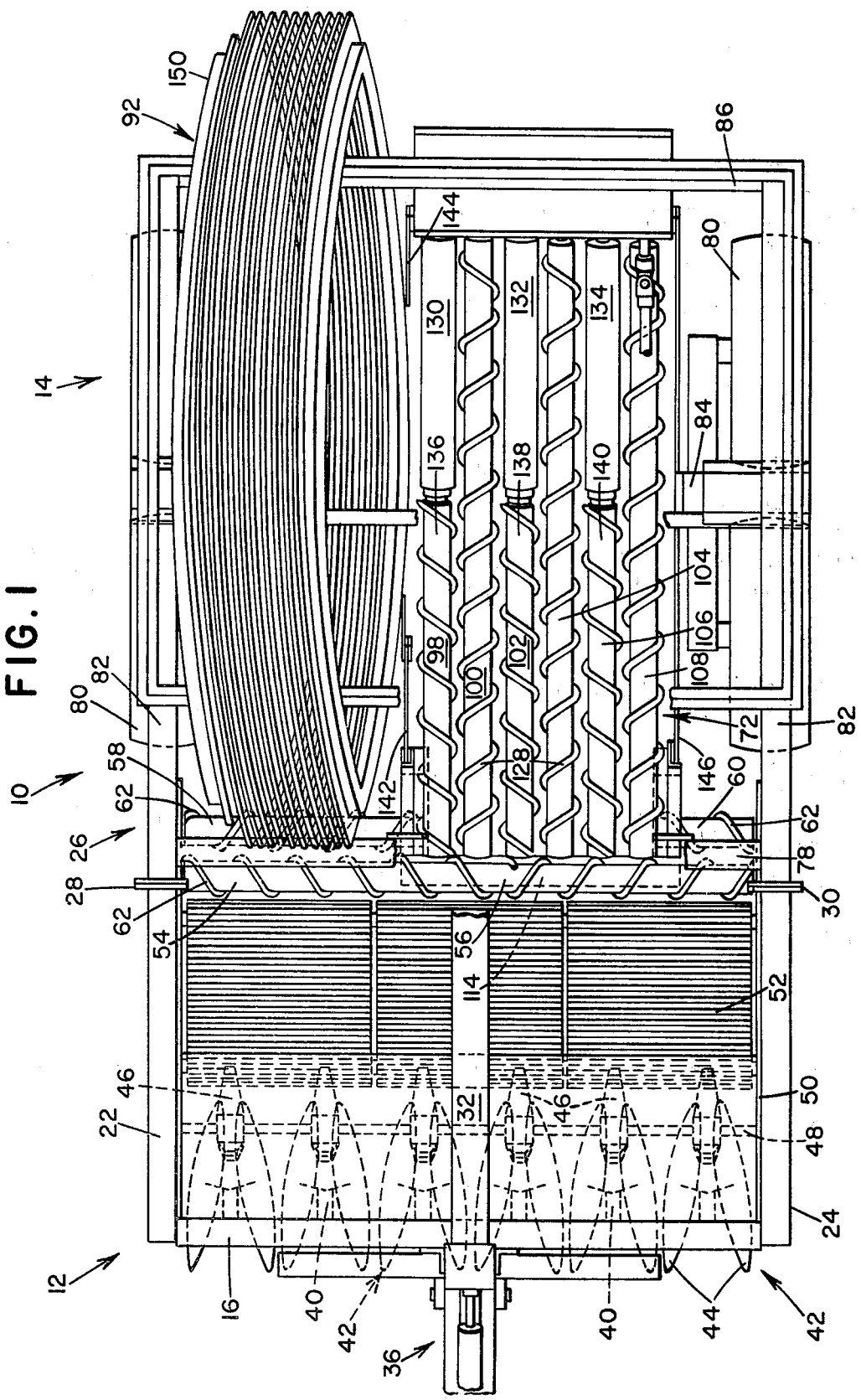
FIG. 1 is a top view of the beet harvester embodying the present invention.
Figure 2:
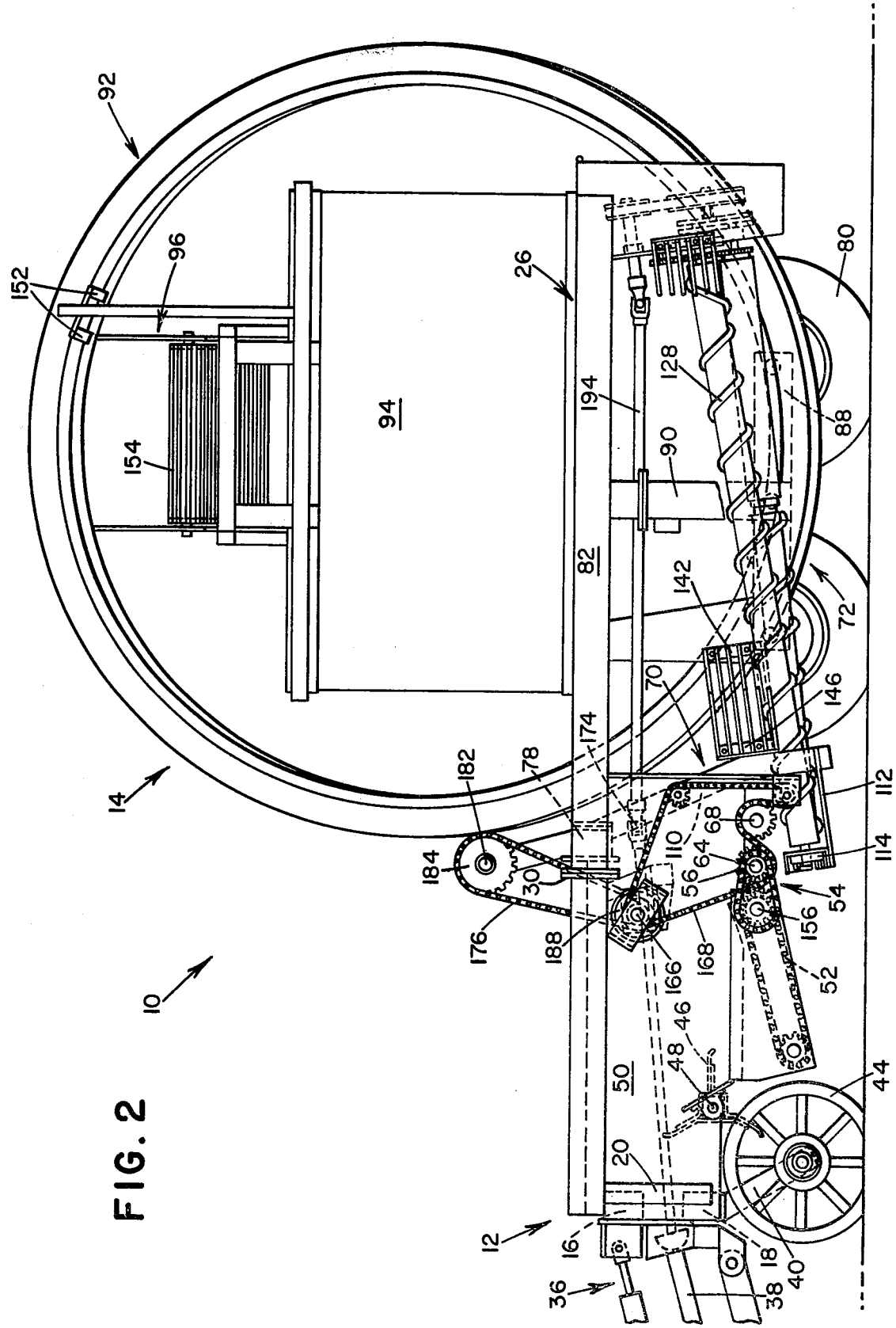
FIG. 2 is a side view of the improved beet harvester.

Referring now to the drawings, and particularly to FIGS. 1 and 2, there is illustrated a beet harvester 10 utilizing the present invention. This harvester 10 includes a header assembly designated generally by the number 12 and a processing chassis designated generally by the number 14.

Figure 5:
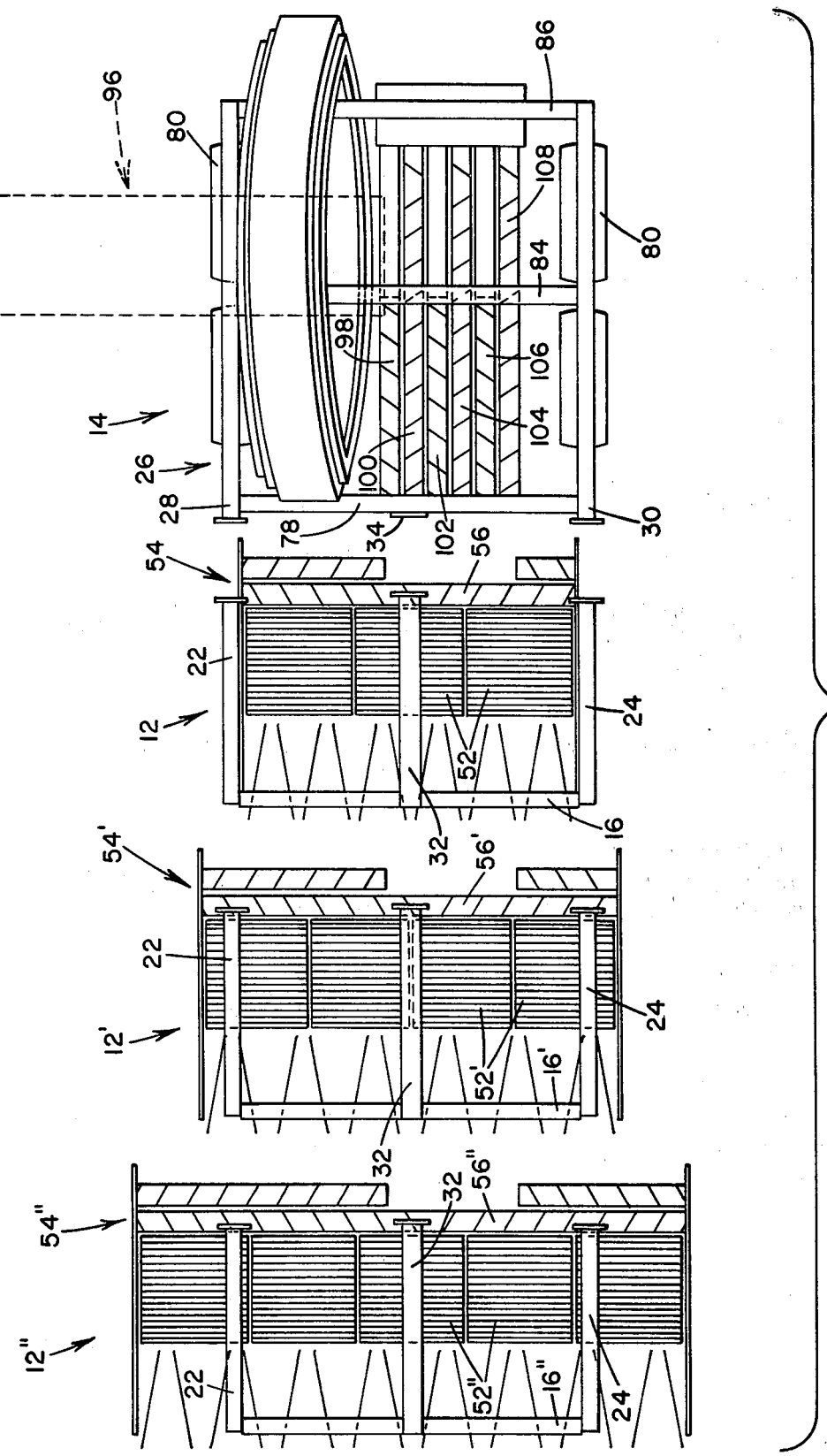
FIG. 5 is a schematic illustration of the header assemblies which can be simply mounted to the processing chassis.

As illustrated in FIGS. 1 and 2, the header assembly 12 is rigidly attached to the processing chassis 14. The header assembly 12 includes a frame structure composed of vertically spaced forwardly beams 16 and 18 joined together by vertical plates 20. The top beam 16 is rigidly coupled at its opposite ends with transversely spaced fore-and-aft beams 22 and 24. These latter beams 22 and 24 are in turn connected by bolts to the chassis frame 26 at 28 and 30 respectively. A third header fore-and-aft beam 32 provides additional structural stability to the header assembly 12 and is connected at its opposite ends to the header beam 16 and the chassis frame at 34. FIG. 5 illustrates three different header asemblies 12, 12' and 12" adapted for mounting on the processing chassis 14. In the large assemblies, the similar components are identified by identical members with prime designations or double prime designations. Those components function essentially the same as in the more narrow header assembly 12 discussed herein in detail.

Figure 6:
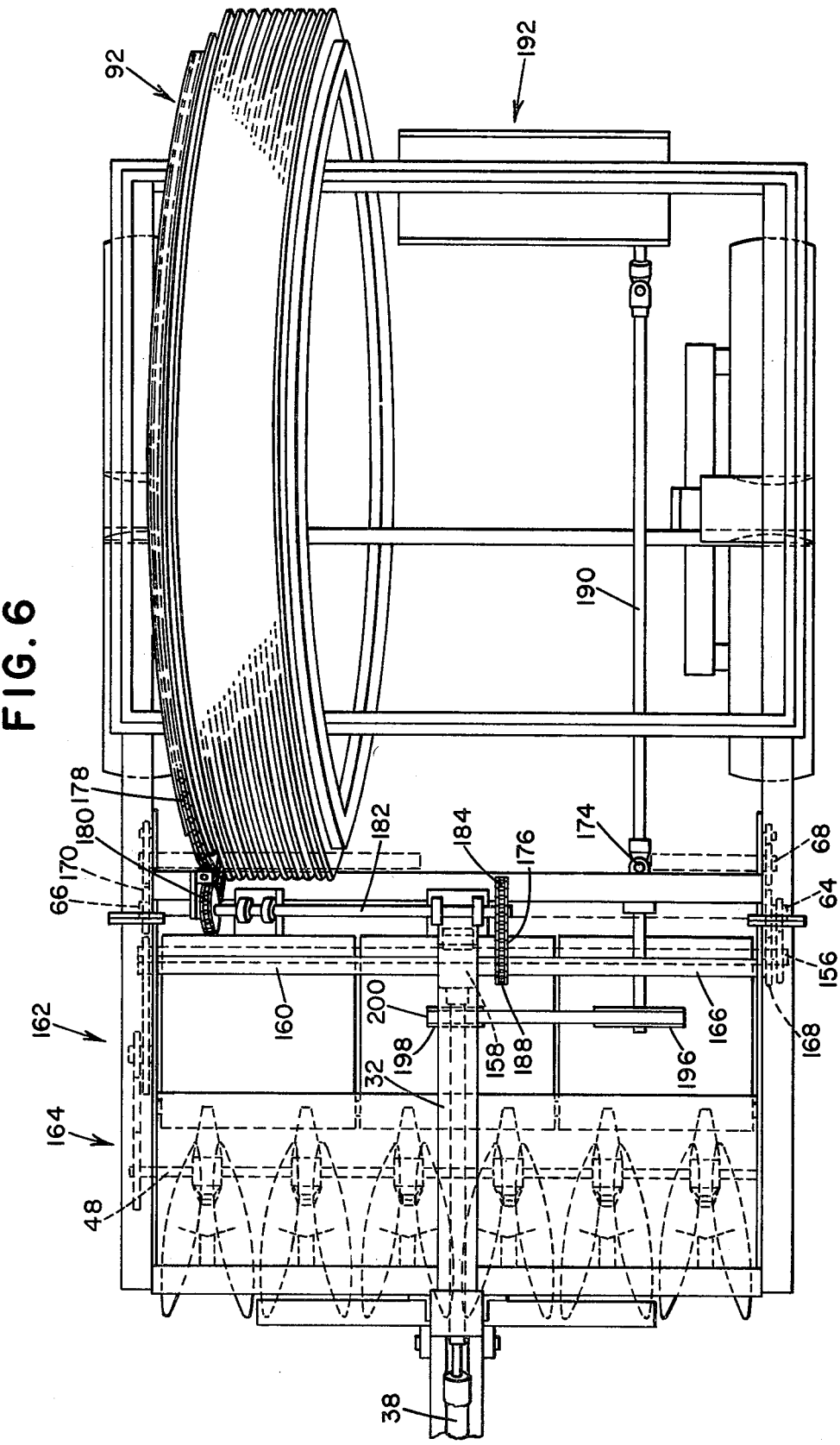
FIG. 6 is a schematic illustration of the operating component drives and connections on the header assembly and processing chassis.

The forward end of the header assembly 12 is supported by hitch structure 36 illustrated partially in FIGS. 1, 2 and 6. This structure 36 is pivotally connected to the forwardly beams 16 and 18 for swinging movement about a horizontal axis and is adapted at its forward end in a conventional manner for connection to the drawbar of a tractor (not shown). The hitch 36 carries a PTO shaft 38 which transmits power from the tractor PTO to the various operating components of the harvester 10.

Conventionally supported on respective standards 40 which depend from the lower transverse beam 18 are digger wheel units 42. The standards 40 are adapted for transverse movement on the lower beam 18 to accomodate various row spacings. While not illustrated, each digger unit 42 is adapted for vertical adjustment as well as lateral adjustment. Each unit 42 is comprised of a pair of cooperating digger wheels 44 rotatably supported on opposite sides of the vertical standard 40.

Rearwardly spaced of each digger wheel unit 42 is a paddle wheel 46 which projects between the upper rear portions of the adjacent wheels 44 to receive beets lifted from the soil. The paddles 46 are carried on a common shaft 48 which extends transversely between the upstanding side plates 50 of the header assembly 12. Each paddle 46 is mounted on the shaft 48 to permit it to be transversely adjusted for the desired row spacing.

The paddles 46 are driven in a counterclockwise direction, as viewed in FIG. 2, to lift the beets elevated by the digging units 42 and shift them rearwardly onto the transverse chain conveyor 52 located immediately behind the digger units 42. Conventional star wheel-type conveyors could be utilized in place of the preferred chain conveyor illustrated. The chain conveyor 52 extends rearwardly and is inclined upwardly from the digging units 42 as best shown in FIG. 2. After the beets have been deposited onto the chain conveyor 52, they are moved rearwardly onto the transversely extending grab roll conveyor 54 positioned immediately to the rear.

The transverse grab roll conveyor 54 in the preferred embodiment is comprised of three parallel cooperating grab rolls 56, 58 and 60. Each roll 56, 58 and 60 is composed of a cylindrical tube having spiralled flightings 62 fixed thereto. The diameters of these tubes and their respective flightings are similar so as to minimize the damage that could occur to the beets as they are conveyed and tumbled in the trough formed between the rolls.

Each tube is supported centrally within by a shaft 64, 66 and 68 which extends through to opposite ends. Each end of the shaft 64 and its roll 56 and the outer ends of the shafts 64 and 66 and their respective rolls 58 and 60 are carried in bearing supports mounted on the upright plates 20. As will hereinafter be described in detail, the inner ends of the shafts 66 and 68 for rolls 58 and 60 respectively are supported by the L-shaped brackets 70 carried beneath the chassis frame 26 and best illustrated in FIG. 4.

Figure 4:
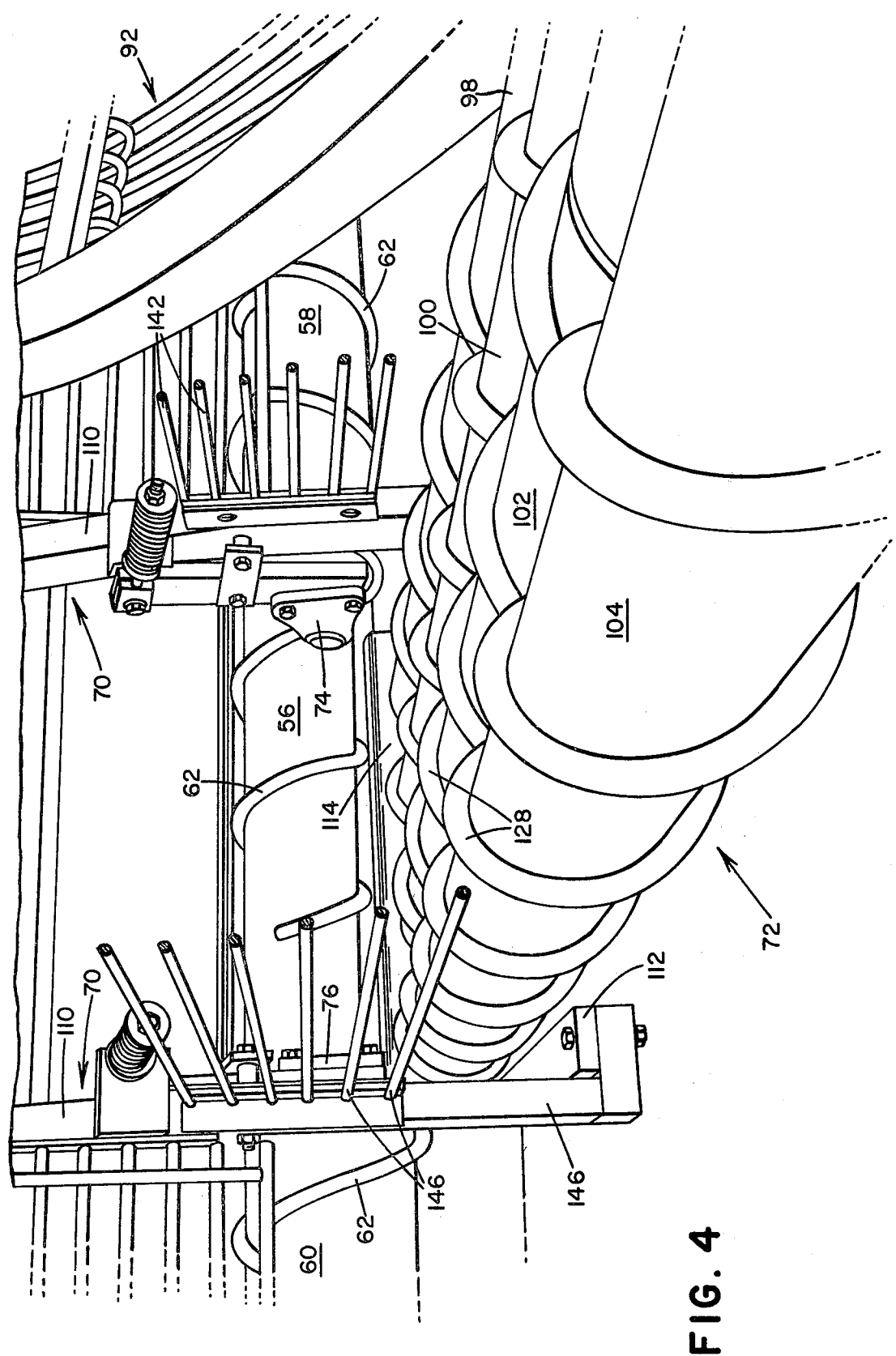
FIG. 4 is an enlarged perspective of the beet discharge area between the transverse conveyor and a modified fore-and-aft conveyor having four fore-and-aft rolls.

The adjacent flightings 62 on the counter-rotating grab rolls 56, 58 and 60 are of opposite hands so as to move the beets received from the chain conveyor 52 transversely toward the center discharge opening illustrated in FIG. 4 where they are then dropped onto the fore-and-aft grab roll conveyor 72 carried beneath the chassis frame 26. As the beets are conveyed towards this opening, the scrubbing and tumbling action caused by the rotating flightings 62 removes dirt and other foreign material from them.

The discharge opening in the transverse conveyor 54 is formed by the adjacent terminating ends of the grab rolls 58 and 60. As is best viewed in FIG. 4, these rolls 58 and 60 are supported by bearings 74 and 76 which in turn are carried by the L-shaped brackets 70 that depend from the front end of the transverse beam 78 of the processing chassis 14. These bearing supports 74 and 76 and the bolted connections at 28, 30 and 34 are the only structural connections supporting the header assembly 12 on the chassis 14. As schematically illustrated in FIG. 5, various header assemblies of differing widths can be provided whereby the same connecting structure will permit the dealer or buyer to adapt the implement to whatever row width, row spacing or capacity that is required.

Returning to FIG. 1, the processing chassis 14 includes a generally rectangular frame structure carried on left and right pairs of ground-engaging wheels 80. The frame structure includes transversely spaced fore-and-aft extending members 82 and fore-and-aft spaced transversely extending members 78, 84 and 86. The tandem wheels 80 are rotatably supported on respective walking beams 88 which in turn are pivotally coupled with respective depending supports 90 that are bolted to the transverse frame member 84.

The chassis 14 carries the centrally located fore-and-aft extending roll conveyor 72 between the wheels 80 and an elevating wheel conveyor 92 which is offset from a fore-and-aft center line through the chassis 14. A storage tank 94 is carried on the frame structure and a reversible and extensible cross conveyor 96 is carried in root-receiving relation to the wheel elevator 92 and in root-discharge relationship to the tank 94.

The fore-and-aft roll conveyor 72 in the preferred embodiment is comprised of three adjacent paired cooperating counter-rotating grab rolls 98 and 100, 102 and 104, and 106 and 108. The forward end of this conveyor 72 is carried in root-receiving relation to the discharge opening in the transverse conveyor 54 of the header assembly 12. The forward ends of the grab rolls 98, 100, 102, 104, 106 and 108 are supported along a generally horizontal line below and forwardly of the transverse grab rolls 58 and 60. These six rolls are supported at their forward ends in suitable bearing blocks that are carried by the depending L-shaped brackets 70.

These brackets 70 are best shown in FIGS. 2 and 4 and are comprised of a first leg 110 bolted to the transverse frame member 78 of the chassis 14 and depending therefrom and extending slightly to the rear. At its lower end, the leg 110 carries in cantilevered fashion a forwardly projecting leg 112 which supports at its forward end the bearing supports 114 for the fore-and-aft grab rolls of the roll conveyor 72. Each depending leg 110 of each bracket 70 further carries midway between its ends a bearing support 74 or 76 upon which a respective shaft 66 and 68 is mounted. It is between the terminating ends of these grab rolls 58 and 60 and above the lower forward end of the fore-and-aft conveyor 72 that the discharge opening is formed and through which the beets pass from the transverse roll conveyor 54 to the fore-and-aft roll conveyor 72.

Figure 3:
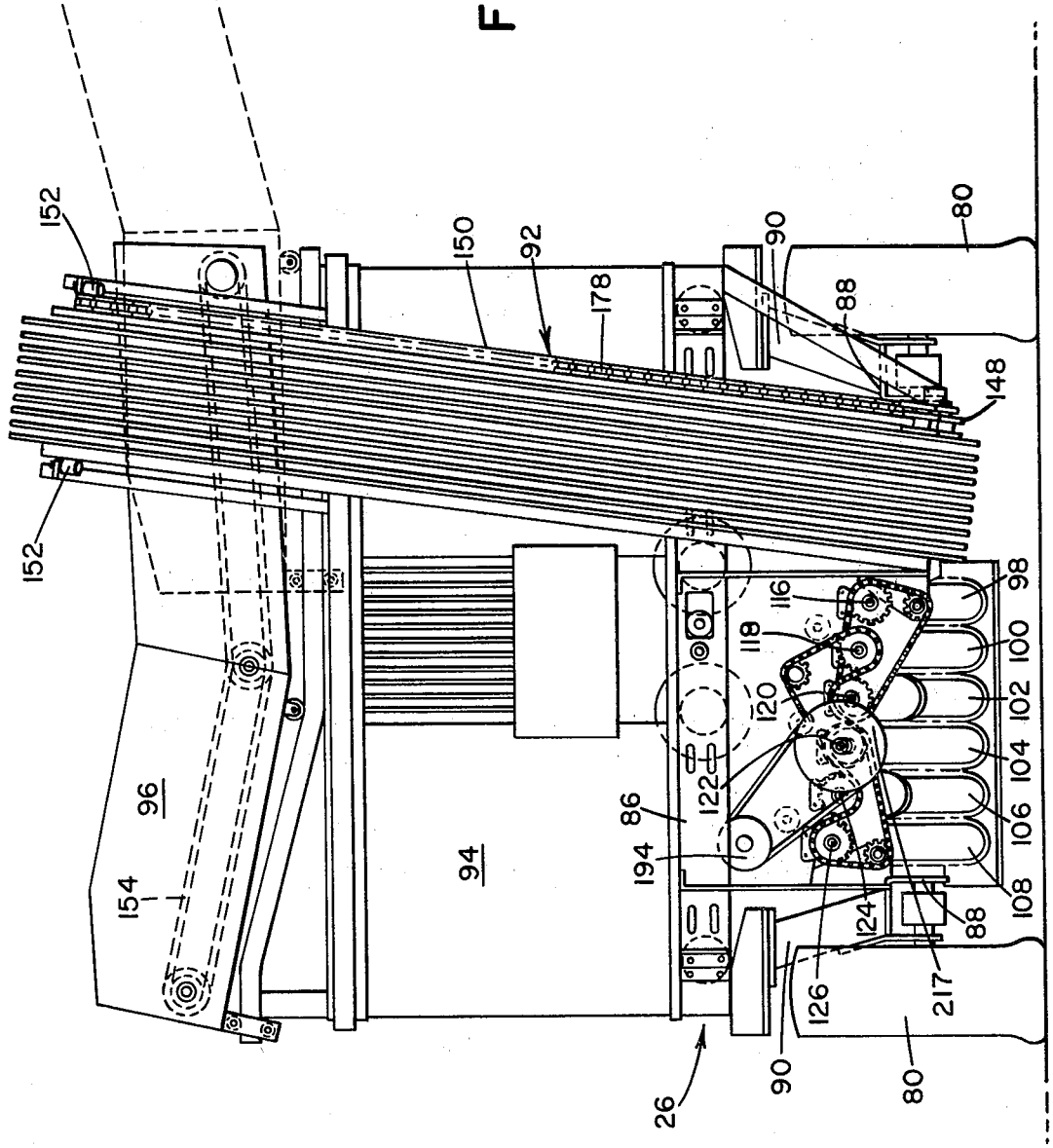
FIG. 3 is an end view of the improved beet harvester.

As is best shown in FIGS. 2 and 3, the fore-and-aft roll conveyor 72 is inclined upwardly from front to rear and also transversely inclined at its rearward end across its width from a low point adjacent the wheel elevator 92.

Each fore-and-aft grab roll of the conveyor 72 is composed of a cylindrical tube also supported centrally within by respective shafts 116, 118, 120, 122, 124 and 126. The forward ends of these shafts would be supported in the journal supports carried by the L-shaped brackets 70. Each counter-rotating pair of rolls 98 and 100, 102 and 104, and 106 and 108 are provided with opposed flightings 128 to move the beets rearwardly in the trough or groove formed between the pair of rolls. The flightings 128 additionally act to scrub and tumble the beets to remove dirt and other foreign material as they are conveyed.

Figure 7:
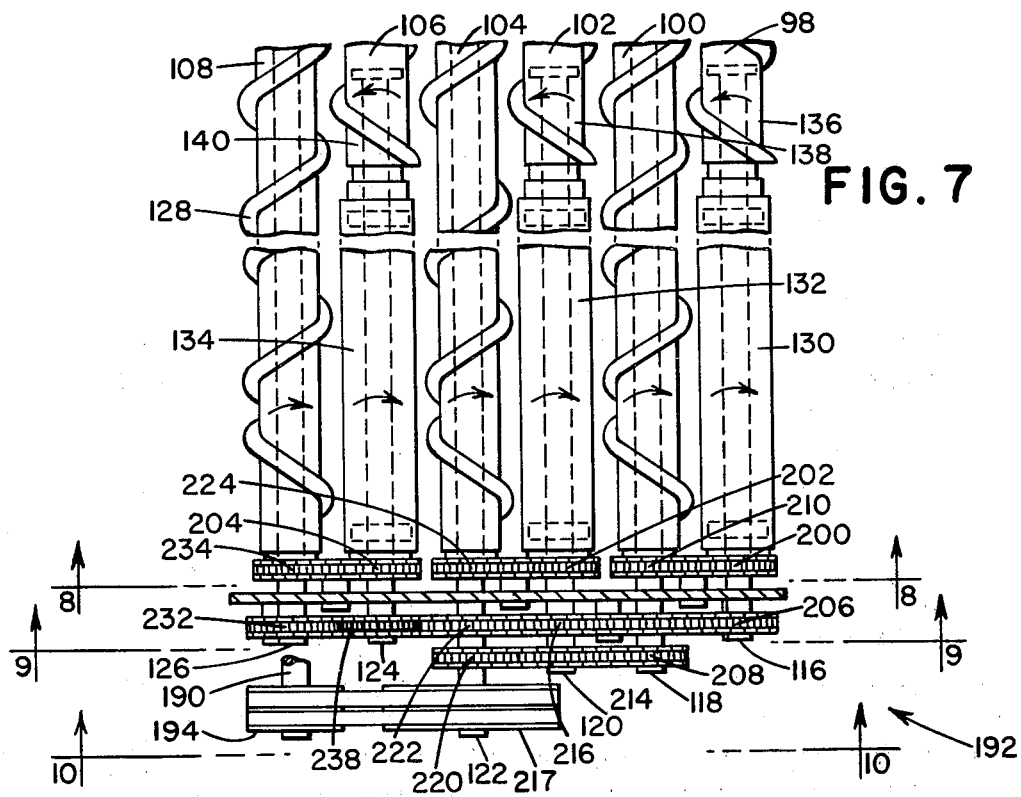
FIG. 7 is an enlarged plan view of the reversing roll area and its drive arrangement.
Figure 8:
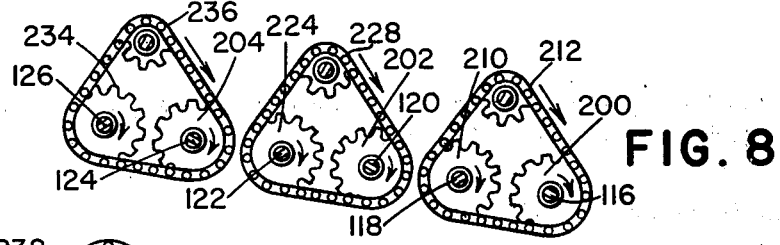
FIG. 8 is a view taken along lines 8—8 of FIG. 7.
Figure 9:
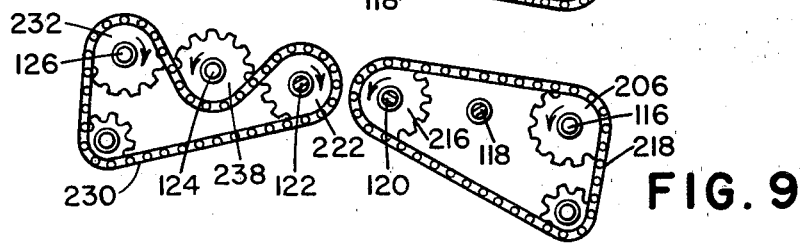
FIG. 9 is a view taken along lines 9—9 of FIG. 7.

The rearward end of the fore-and-aft conveyor 72 is provided with a reversing roll area adapted to move the beets transversely for discharge into the wheel elevator 92. Reversing rolls such as these are old and known in the art. For another example of a reversing roll application, see co-pending application of assignee Ser. No. 947,182 filed Sept. 28, 1978. To accomplish this movement, the rearward portion of the grab rolls all rotate in the same direction, i.e., towards the wheel elevator 92. As is best viewed in FIGS. 1 and 7, the rearward sections 130, 132 and 134 are separate from their respective forward sections 136, 138 and 140. Each set of coaxial sections rotate about a common shaft with the forward end of the rearward sections 130, 132 and 134 being supported on separate bearings carried on their respective shafts within them. The drive arrangement illustrated in FIGS. 7, 8, 9 and 10 rotates each of the rear sections 130, 132 and 134 in a direction opposite from that direction of rotation of its forward counterpart sections 136, 138 and 140. Consequently, beets conveyed rearwardly between adjacent pairs of rolls are tumbled transversely toward the wheel elevator 92 as they reach the area of the rear or reversing sections 130, 132 and 134. The reversing roll sections 130, 132 and 134 are provided with a diameter similar to that diameter of the flightings of their respective forward sections 136, 138 and 140 to minimize crushing damage to the roots as they reach the discharge area. Further the reversing roll section 130, 132 and 134 have no flightings fixed thereto which could inhibit transverse movement of the beets toward the wheel elevator 92.

The fore-and-aft conveyor 72 is inclined from front to rear to extend the time required for the beets to be conveyed along it. In the preferred embodiment, the incline is approximately 7°.

Bar-type side shields 142, 144 and 146 are also provided along each side of the fore-and-aft conveyor 72 to contain the beets as they are scrubbed and tumbled up the 7° incline.

Figure 10:
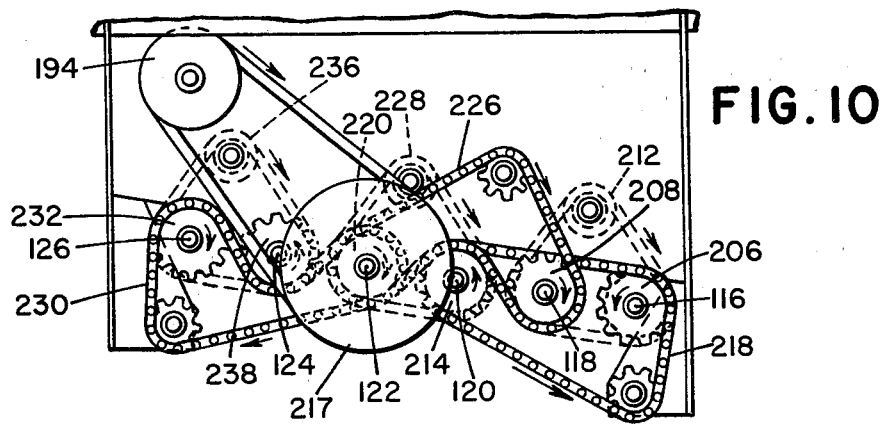
FIG. 10 is an end view of the drive arrangement illustrated in FIG. 7.

As best shown in FIGS. 3 and 10, the rearward ends of the shafts about which the fore-and-aft rolls rotate are also inclined upwardly from a low point adjacent the wheel elevator 92 to utilize gravity in discharging the beets transversely into the wheel elevator 92. This incline in the preferred embodiment is approximately 3°. Accordingly, the rearward end of the grab roll 98 nearest the wheel elevator 92 is elevated above its forward end approximately 7° and the rearward end of the grab roll 108 furthest from the wheel elevator 92 is elevated approximately 10° above its forward end.

To contain the beets and assure that they are discharged from the fore-and-aft conveyor 72 into the wheel elevator 92, the side shields 142, 144 adjacent the grab roll 98 nearest the wheel elevator 92 extends both forwardly of and rearwardly of the wheel elevator beet-receiving area.

The wheel elevator 92 is supported for rotation about a generally horizontal axis. As shown in FIG. 3, this axis is inclined slightly relative to the horizontal so as to position the beet-receiving bottom portion of the elevator 92 adjacent to the fore-and-aft conveyor 72 yet permit the beet-discharging portion near its top to be centered between the retracted and extended position of the cross conveyor 96. The wheel elevator 92 is supported for rotation upon rollers 148 which are engageable with the circular frame structure 150 of the wheel elevator 92. Similar rollers 152 at the top of the wheel elevator 92 contain it within its plane of rotation by exerting generally transverse forces upon the circular frame structure 150.

As beets are elevated by the wheel elevator 92, they are discharged onto the endless cross conveyor 154 carried on top of the tank 94. To convey the beets into the tank 94, the cross conveyor 154 is shifted from its transverse position illustrated by solid lines in FIG. 3 to its operational position illustrated by dotted lines. The beets are then conveyed along the endless conveyor 154 which is driven by a hydraulic motor (not shown) and drop into the tank 94 for later discharge through the bottom of the tank 94 and onto the fore-and-aft conveyor 72 when a truck becomes available to receive them. If a truck is available, the conveyor 154 is driven clockwise, as viewed in FIG. 3, to deliver the beets outwardly away from the tank 94 and into the waiting truck.

Looking now to FIG. 6, the drives for the various operating components of the header assembly 12 and chassis 14 are illustrated in schematic form. The operating components of the header assembly 12 include the paddle wheel shaft 48, the shaft 156 which drives the chain conveyor 52 and the three shafts 64, 66 and 68 which drive the transverse conveyor rolls 56, 58 and 60.

Each of these shafts are powered by the PTO shaft 38 through the gear box 158. As is obvious from FIG. 6, the shaft 48 on which the paddle wheels 46 are mounted is driven by the shaft 160 that is driven through the gear box 158. The sprocket and chain assemblies 162 and 164 are provided to step up the rotational speed of the shaft 48 over that speed of the PTO shaft 38. The shaft 64 of the transverse conveyor roll 56 is driven by the shaft 166 that extends from the gear box 158 transversely and downwardly, as viewed in FIG. 6, to transmit power through the chain 168. Both transverse rolls 54 and 60 are driven by shaft 166 through the chain connection 168. Transverse roll 58 is driven by the chain 170 coupled with the other end of shaft 64 of roll 54.

Two connections 174 and 176 transmit power between the header assembly 12 and chassis 14 to drive the fore-and-aft roll conveyor 72 and the wheel elevator 92. The cross conveyor 96 is driven by a separate hydraulic motor. The wheel elevator 92 is rotated by the chain 178 which is trained around the circumference of the wheel elevator 92 and the sprocket 180 mounted on the shaft 182. At the other end of the shaft 182 is carried a sprocket 184 that can be quickly coupled by chain 176 to a compatible sprocket 188 carried on the shaft 166 of the header assembly.

The fore-and-aft rolls are driven by a shaft 190 extending from the front of the chassis 14 to its rear portion and coupled with the drive arrangement 192 provided to drive the fore-and-aft rolls in the reversing manner described above. A detailed description of the drive arrangement will be found below. Power is transmitted from the PTO to the shaft 190 which drives the fore-and-aft conveyor 72 through the U-joint connection designated by the number 174. This U-joint connection 174 connects the pulley 194 and the shaft 190 with the belt driven pulley 196 which is powered by the pulley 198 that is carried on the header assembly 12. Thus, to transmit power from the header 12 to the chassis 14 requires only that the chain 176 be installed and the U-joint 174 connected.

The drive arrangement illustrated in FIGS. 7, 8, 9 and 10 rotates the paired rolls in a counter-rotating manner and also reverses the rotational direction of the reversing sections 130, 132 and 134 to discharge the beets transversely into the wheel elevator 92.

The paired counter-rotating rolls, that is the non-sectioned rolls 100, 104 and 108 and their respective forward sections 136, 138 and 140 are fixed to their respective shafts and rotate with those shafts as they are driven. The reversing section 130, 132 and 134 are rotated about their respective shafts 116, 120 and 124 on conventional bearing arrangements schematically illustrated in FIG. 7. The reversing sections 130, 132 and 134 are fixed with the respective sprockets 200, 202 and 204 and rotate as the sprockets are rotated.

The forward section 136 is driven by shaft 116 which is fixed to sprocket 206. Chain 218 drives the sprocket 206.

Sprockets 208 and 210 are fixed to shaft 118 with sprocket 208 driving this shaft. Sprocket 210 drives the adjacent reversing section 130 through chain 212 (see FIG. 8).

Sprockets 214, 216 and 202 are fixed to shaft 120. Sprocket 214 drives the shaft 120 and its forward roll section 138. Sprocket 216 drives the chain 218 to drive sprocket 206, its shaft 116 and forward section 136.

Pulley 217 is fixed to shaft 122 and powers all the shafts as well as driving shaft 122. Also fixed to shaft 122 are sprockets 220, 222 and 224. Sprocket 220 drives chain 226 which drives shafts 120 and 118 and respectively forward section 138 and the roll 100. Sprocket 224 drives chain 228 to rotate the reversing section 132 carried on the adjacent shaft 120.

Sprockets 238 and 204 are fixed to shaft 124 and are driven by chain 230.

Sprockets 232 and 234 are fixed to shaft 126 and are driven by chain 230. Sprocket 234 drives the adjacent reversing section 134 through chain 236.

In operation, the pulley 217 rotates the shaft 122 and its roll 104 clockwise. The shaft 122 rotates sprockets 220, 222 and 224 clockwise to drive respective chains 226, 230 and 228 clockwise about shaft 122. Accordingly, chain 226 drives sprocket 208 and its shaft 118 and roll 100 clockwise and sprocket 214 and its shaft 120 and the forward section 138 counterclockwise. As shaft 118 is rotated clockwise, so is its sprocket 210 which drives the sprocket 200 and its reversing roll 130 in a clockwise direction. As shaft 120 is rotated counterclockwise, sprocket 216 is rotated counterclockwise to drive chain 218 and sprocket 206 fixed to shaft 116 counterclockwise. Accordingly, forward section 136 fixed to shaft 116 is driven counterclockwise.

Sprocket 224 fixed to shaft 122 adn roll 104 is driven in a clockwise direction and in turn drives the chain 228 and sprocket 202 fixed to reversing section 132 in a clockwise direction.

Sprocket 22 fixed to shaft 122 is also driven in a clockwise direction and drives sprocket 232 fixed to shaft 126 clockwise and sprocket 238 fixed to shaft 124 counterclockwise. The respective roll 108 and forward section 140 are respectively driven clockwise and counterclockwise.

Sprocket 234 fixed to shaft 126 is rotated clockwise and drives chain 236 clockwise to rotate sprocket 204 fixed to reversing roll 134 in a clockwise direction.

This drive arrangement thus rotates the reversing rolls 130, 132 and 134 oppositely to their respective forward sections 136, 138 and 140 to discharge the beets transversely from the fore-and-aft conveyor 72. If the processing capacity of the harvester 10 requires four instead of six fore-and-aft conveyor rolls, the drive arrangement 192 can nevertheless be utilized. in such a situation, rolls 106 and 108 would be eliminted and no chain 230 would be trained over sprocket 222 that is fixed to shaft 122.

Once at the field and in operation, the digger units 42 lift the beets from the soil and swing them upwardly and rearwardly where the paddle wheels 46 shift them onto the chain conveyor 52. They are then conveyed over the leading transverse grab roll 56. The flightings 62 of the transverse conveyor rolls 54, 58 and 60 then shift the beets towards the discharge opening meanwhile scrubbing and cleaning the dirt from them as they are conveyed along. As the beets reach the discharge opening, they drop onto the forward end of the fore-and-aft conveyor 72. They then settle between each counter-rotating pair of rolls of the fore-and-aft conveyor 72 and the flightings 128 continue to scrub and tumble them to remove the dirt and other foreign material. Due to the incline of the fore-and-aft conveyor 72, the scrubbing action is extended as the beets are moved to the rearward portion. The bar-type guards 142, 144 and 146 contain the beets on the conveyor 72 during this rearward movement. Once in the reversing roll area, they are tumbled toward the wheel elevator 92 due to the sideways incline and reversing roll rotation. They then fall into the wheel elevator 92, are elevated as it rotates and are discharged onto the cross conveyor 96 for delivery to either the holding tank 94 or a truck traveling alongside the harvester 10.

We clam:

1. In a root harvester comprising: a mobile processing chassis having a frame with transverse and fore-and-aft extending frame members joined together, a fore-and-aft extending root conveyor composed of at least one pair of flighted and cooperating counter-rotating rolls, means supporting said rolls at their rearwad ends in vertically spaced relation to one another; a header assembly having a frame structure with transverse and fore-and-aft extending frame members. root-digging means carried by the frame structure for lifting roots from the ground, a transverse roll conveyor having a plurality of cooperating grab rolls spaced rearwardly of the digging means for receiving roots lifted by the digging means and for conveying said roots toward an elongated discharge opening adjacent the terminating end of one grab roll; and means for removably attaching the header assembly to the processing chassis including connecting means for rigidly joining fore-and-aft extending members of the processing chassis and header assembly together, bracket means depending from the processing chassis, first support means carried by the bracket means for rotatably supporting said terminating roll, and second support means carried by the bracket means for rotatably supporting the forward ends of the cooperating rolls vertically below their respective rearward ends.

2. An improved elongated material conveyor means adapted to receive material at one end and discharge said material from one side adjacent its other end, said means comprising: a plurality of elongated and closely spaced material-carrying surfaces extending between the ends of said means; first means supporting the one end of said surface along a substantially horizontal plane; and second means supporting the other end of said surfaces vertically spaced above their respective one ends, and with respect to each other so as to cause the other end of said conveyor means to be inclined upwardly across its width from its discharge side.

3. An improved elongated root conveyor means adapted to receive roots at one end and discharge said roots at its other end, comprising: at least one pair of closely spaced cooperating and counter-rotating conveyor rolls extending between the ends of said means; first means supporting the one ends of said rolls along a substantially horizontal line; second means supporting the other ends of said rolls vertically above their respective one ends and also in vertically stepped relationship to one another across the width of said conveyor means.

4. The invention defined in claim 3 wherein one roll of each pair is composed of first and second sections, the second section and the other roll of said pair being rotatable in the same direction and the first section being rotatable in the opposite direction.

5. The invention defined in claim 4 wherein the other roll and the first section are provided with helical flights of opposite hand and the surfaces of the second section is generally smooth, having a diameter substantially equal to the diameter of the helical flights on said first section.

6. An elongated conveyor means adapted to receive material across its one end, convey the material along its length and discharge said material from one side near its other end comprising: at least two grab rolls having adjacent ends supported in horizontal relation and their other ends supported in vertically spaced and adjacent relation, one roll being composed of first and second sections, the first section being rotatable in a direction opposite to the direction of rotation of the other roll and the second section being rotatable in the same direction as the other roll.

7. A root crop harvester having a mobile frame, a root-digging means carried by the frame, a root-elevating means carried by the frame and an improved root-conveying means adapted to receive at its one end roots dug by the digging means and to discharge said roots from one side near its other end for subsequent elevation by the elevating means comprising: at least one pair of elongated conveyor rolls extending between the ends of the conveying means, said rolls adapted for rotation about their longitudinal axes and disposed to form a root-receiving trough therebetween; first means carried by the frame rotatably supporting the one end of said rolls substantially horizontally; and second means rotatably supporting the other ends of said rolls vertically above their respective one ends and also in vertically stepped relation to one another from the discharge side of said conveying means and extending across its width.

8. A root crop harvester having a mobile frame, a root-digging means carried by the frame, a root-elevating means carried by the frame and an improved elongated root-conveying means adapted to receive at one end roots dug by the digging means and to discharge said roots from one side near its other end for subsequent elevation by the elevating means comprising: first and second cooperating grab rolls extending between the ends of the conveying means, said rolls having oppositely wound flights and forming a longitudinally extending root-conveying trough therebetween, the first roll composed of first and second sections, the second section having a substantially smooth exterior surface; means supporting the one ends of said rolls in a substantially horizontal plane; means supporting the other ends of said rolls above their respective one ends and also in ascending relation from the one side of said conveying means; and means rotating the first section and second roll inwardly toward each other and the second section in the same direction as the second roll.

9. A root crop harvester having a mobile frame, a root-digging means carried by the frame, a first conveyor means carried on the frame for receiving roots from the digging means, a root-elevating means carried by the frame, and an improved second conveyor means for receiving roots from the first conveyor means and moving said roots toward the root-elevating means comprising: cooperating first and second flighted conveyor rolls having adjacent ends carried horizontally and in root-receiving relationship to the first conveyor means, said rolls having opposite ends carried in vertically spaced relationship to one another and in root-delivering relationship to the elevating means, said first roll composed of root-receiving and root-delivering sections; and roll drive means for rotating the root-receiving section of the first roll and also the second roll in opposite directions to convey roots therealong and the root-delivering section in the same direction as the second roll to convey roots to the side of the second conveyor means and the elevating means.

10. The invention defined in claim 9 wherein said opposite ends of said rolls are vertically spaced above their respective adjacent ends.

11. A root crop harvester comprising: a mobile frame; root-digging means carried at the forward end of the frame; first conveyor means for receiving roots from the digging means and moving them rearwardly; root-elevating means carried on one side of the frame rearwardly of the first conveyor means; and second root conveyor means for receiving roots from the first conveyor means and for moving said roots to the elevating means including: at least one pair of fore-and-aft extending closely spaced conveyor rolls having frame supported forward and rearward ends, the forward ends carried in horizontal and root-receiving relation to the first conveyor means, and the rearward ends carried in vertically spaced relation to one another, one of said rolls being composed of forward and rearward sections; and means drivably rotating the forward section and the other roll in opposite directions and the rearward section in the same direction as the other roll.

12. The invention defined in claim 11 when the forward section and the other roll are provided with flights of opposite hand and the rearward section has a substantially smooth surface and a diameter substantially equal to the diameter of the flights on the forward section.

13. The invention defined in claim 11 wherein the frame is supported on transversely spaced ground wheels that are substantially within the transverse width of the harvester and the elevating means and second root conveyor means are carried by said frame between said wheels.

14. An agricultural harvester comprising: a mobile frame; an elongated grab roll conveyor including generally parallel grab rolls and an elongated discharge opening adjacent the terminating end of one grab roll, said conveyor adapted to move material along said rolls and towards said opening; a fore-and-aft extending roll conveyor composed of paired cooperating grab rolls; and frame-carried means supporting the forward ends of the cooperating grab rolls and the terminating end of said one grab roll including bracket structure depending from the frame, first journal means carried by the bracket structure and supporting the terminating roll end and second journal means carried by the bracket structure and supporting the forward ends of the cooperating grab rolls forwardly of and below the terminating roll end.

15. The invention defined in claim 14 wherein the discharge opening is centrally positioned between the ends of the elongated roll conveyor and is formed between spaced apart terminating ends of two grab rolls.

16. The invention defined in claim 14 wherein the bracket structure is L-shaped and includes a depending leg and a forwardly extending leg supported thereon, and the first journal means is supported by the depending leg and the second journal means is supported by the forwardly extending leg.

17. An agricultural implement comprising: a mobile frame structure; a first elongated material conveyor including a plurality of grab rolls adapted to move material from the ends of the conveyor and towards its center, the rolls adjacent one side of said conveyor having spaced apart terminating ends defining an elongated opening through which said material is discharged; a second elongated material conveyor having a pluraity of grab rolls, the forward ends of said rolls disposed in material-receiving relation to the discharge opening; and support means carried by the frame including an L-shaped bracket structure having one leg depending from the frame and one leg extending forwardly therebelow, said bracket structure carrying on its vertical leg means rotatably supporting one terminating end of a first conveyor grab roll; and further carrying on its forwardly extending leg means rotatably supporting the grab rolls of said second conveyor.

18. The invention defined in claim 17 wherein the forward ends of the rolls of said second conveyor are supported between and beneath the terminating ends of the rolls forming the discharge opening in said first conveyor.

19. Material conveying means comprising: an elongated first roll conveyor having a plurality of cooperating grab rolls, said conveyor adapted to move material along its length for discharge through an opening adjacent the terminating end of one roll; a second elongated roll conveyor having one end disposed in material-receiving relation to said discharge opening and its other end vertically spaced above its one end, said second conveyor including a plurality of flighted and counter-rotating grab rolls cooperating in pairs to move material from the one end of said conveyor and towards the other end, the portion of one of each pair of rolls adjacent the other end of the conveyor adapted to rotate in the same direction as the other of said pair of rolls, and means supporting the end of the grab rolls adjacent the other end of the conveyor along an inclined plane.

20. The invention defined in claim 19 wherein the one end of the second conveyor is supported beneath and substantially perpendicular to the first conveyor in material-receiving relation to said discharge opening.

21. In a root harvester comprising: a mobile processing chassis having a frame with transverse and fore-and-aft extending frame members joined together, a fore-and-aft extending root conveyor having paired and cooperating grab rolls adapted to move roots rearwardly, means depending from the frame for rotatably supporting the rearward ends of the grab rolls, a header assembly including a frame structure having transverse and fore-and-aft extending frame members, root-digging means carried by the frame structure for lifting roots from the ground, a transverse roll conveyor having a plurality of cooperating grab rolls spaced rearwardly of the digging means for receiving roots lifted by the digging means and for conveying said roots toward an elongated discharge opening adjacent the terminating end of one grab roll; and means removably attaching the header assembly to the processing chassis including connecting means for rigidly joining fore-and-aft frame members of the processing chassis and header assembly together, bracket means depending from the processing chassis, first journal means carried by the bracket means for rotatably supporting said terminating roll end, and second journal means carried by the bracket means for rotatably supporting the forward ends of the cooperating grab rolls vertically below their respective rearward ends.

22. The invention defined in claim 21 wherein the bracket means is L-shaped and includes a depending leg and a forwardly extending leg supported thereon, and the first journal means is supported by the depending leg and the second journal means is supported by the forwardly extending leg.

* * * * *

UNITED STATES PATENT OFFICE
CERTIFICATE OF CORRECTION

Patent No. 4,197,916     Dated 15 April 1980

Inventor(s) Virgil D. Haverdink, John E. Maust and Fred C. Livesay, Jr.

It is certified that error appears in the above-identified patent and that said Letters Patent are hereby corrected as shown below:

Column 8, line 67, delete "rearwad" and insert -- rearward --.

Column 9, line 2, delete "members." and insert -- members, --; line 26, delete "surface" and insert -- surfaces --; line 49, delete "surfaces" and insert -- surface --.

Signed and Sealed this

Fifth Day of May 1981

[SEAL]

Attest:

RENE D. TEGTMEYER

Attesting Officer     Acting Commissioner of Patents and Trademarks